(12) United States Patent
Bobak

(10) Patent No.: US 6,763,441 B2
(45) Date of Patent: Jul. 13, 2004

(54) SYSTEM AND METHOD FOR USING ANCILLARY PROCESSORS AND STORAGE TO SPEED TIME CRITICAL DATA CAPTURE

(75) Inventor: Roman A. Bobak, Wappingers Fall, NY (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 10/055,284

(22) Filed: Jan. 23, 2002

(65) Prior Publication Data
US 2003/0140069 A1 Jul. 24, 2003

(51) Int. Cl.[7] .............................................. G06F 13/00
(52) U.S. Cl. ..................... 711/162; 711/165; 711/173; 711/209
(58) Field of Search ................. 711/162, 173, 711/165, 209

(56) References Cited

U.S. PATENT DOCUMENTS

| | | | |
|---|---|---|---|
| 4,807,228 A | 2/1989 | Dahbura et al. | ............... 714/13 |
| 5,491,788 A | 2/1996 | Cepulis et al. | ................ 714/13 |
| 5,495,573 A | 2/1996 | Datwyler et al. | ............. 714/48 |
| 5,774,642 A | 6/1998 | Flon et al. | ..................... 714/13 |
| 5,940,826 A | 8/1999 | Heideman et al. | .............. 707/8 |
| 6,012,148 A | 1/2000 | Laberge et al. | ................. 714/2 |
| 6,058,438 A | 5/2000 | Diehl et al. | .................... 710/24 |
| 6,173,376 B1 * | 1/2001 | Fowler et al. | .............. 711/162 |
| 6,467,007 B1 * | 10/2002 | Armstrong et al. | ......... 710/260 |

OTHER PUBLICATIONS

Modular Data Processing System, Janson, Jenny & Rothauser, IBM Technical Disclosure Bulletin, vol. 21, No. 7, Dec. 1978.

Slicing the AS/400 with Logical Partitoning: A How to Guide, Chapters 1,5,7; Appendix A and G, Schimuek et al; Aug. 1999.

* cited by examiner

Primary Examiner—Reba I. Elmore
(74) Attorney, Agent, or Firm—William A. Kinnaman, Jr.; Cantor Colburn LLP

(57) ABSTRACT

A method for using ancillary processors and memory to speed critical data capture includes building a list memory address ranges associated with a secondary partition. The memory address ranges are located in central storage memory and contain the data to be captured. The method also includes reading the data from the memory address ranges and writing the data to a portion of memory reserved by a first partition as a capture pool. The capture pool is also located in central storage memory and is not accessible by the secondary partition. The invention also includes a system for using ancillary processors and storage to speed time critical data captured.

15 Claims, 3 Drawing Sheets

SYSTEM AND METHOD FOR USING ANCILLARY PROCESSORS AND STORAGE TO SPEED TIME CRITICAL DATA CAPTURE

FIELD OF THE INVENTION

This invention relates to data exchange and more specifically to the use of ancillary processors and storage to speed time critical data capture.

BACKGROUND OF THE INVENTION

Computer systems are a vital part of almost every business. As a result, the preservation of data and the maintaining of data integrity is critical. Moreover, inaccessibility to computer systems due to system failure, system maintenance, or system delays can result in economic losses to those parties involved in transactions requiring the use of the computer systems.

Certain operations, such as the capture of diagnostic and error information or the recording of transaction logs, cause other operations to be suspended or delayed. The problem is worsened where the speed of outboard storage devices fail to match the speed of internal storage devices and processors.

In addition, critical data is at a risk of loss if the capture of such data is not completed prior to an event that precludes data capture. This is exemplified where a system fails or "crashes" prior to the completion of a critical data capture. The chance of such a loss is further heightened where critical data capture is directed to slower outboard storage devices.

The present invention provides for the use of ancillary storage and processors to speed time critical data capture.

SUMMARY OF THE INVENTION

The above-stated deficiencies are overcome by a method and system for using ancillary processors and memory speed critical capture. The method includes building a list of memory address ranges associated with a second secondary partition. The memory address ranges are located in central storage memory and contain the data to be captured. The method also includes reading the data from the memory address ranges and writing the data to a portion of memory reserved by a first partition as a capture pool. The capture pool is also located in central storage memory and is not accessible by the secondary partition. The invention also includes a system for using ancillary processors and storage to speed time critical data capture.

DETAILED EMBODIMENT

Logical partitioning ("LPAR"), first studied by IBM® as early as 1976, allows a computer system to be split into multiple independent systems capable of simultaneously running applications in multiple, independent environments. For example, LPAR makes it possible for a user to run a single application using different sets of data on separate partitions, as if it was running independently on separate physical systems. While earlier implementations of LPAR were limited to physical partitioning, later implementations allow partitions to share resources. Thus, LPAR also makes it possible for a user to run multiple applications on separate partitions using the same set of data stored in shared resources.

LPAR can be used to minimize financial costs and system management requirements. For example, in a production software/test software environment, LPAR would allow production and test systems to be located in the same physical hardware. Upon validation of changes to test system applications and the duplication of the changes to the production system applications, resources used by the test system are reallocated to the production system. Without LPAR, separate physical systems would be required for the test system and for the production system. Thus, at least two physical systems would have to be purchased, installed, and maintained. Moreover, once application changes were completed the test system would no longer be utilized.

A system enabled for LPAR generally includes a computer that comprises resources such as processors, central storage memory, and input/output processors. The physical system is then divided into logical systems, known as partitions. A primary partition ("service processor") owns and manages physical system resources and provides management functions to logical partitions. In addition, the primary partition can function as a hub for external communications.

Secondary partitions are created and managed by the service processor, but function as independent systems within the entire partitioned system. They may be assigned their own resources including processors, central storage memory, system buses, system values, time-of-day, operating systems, applications, files and user profiles.

Figure 1:
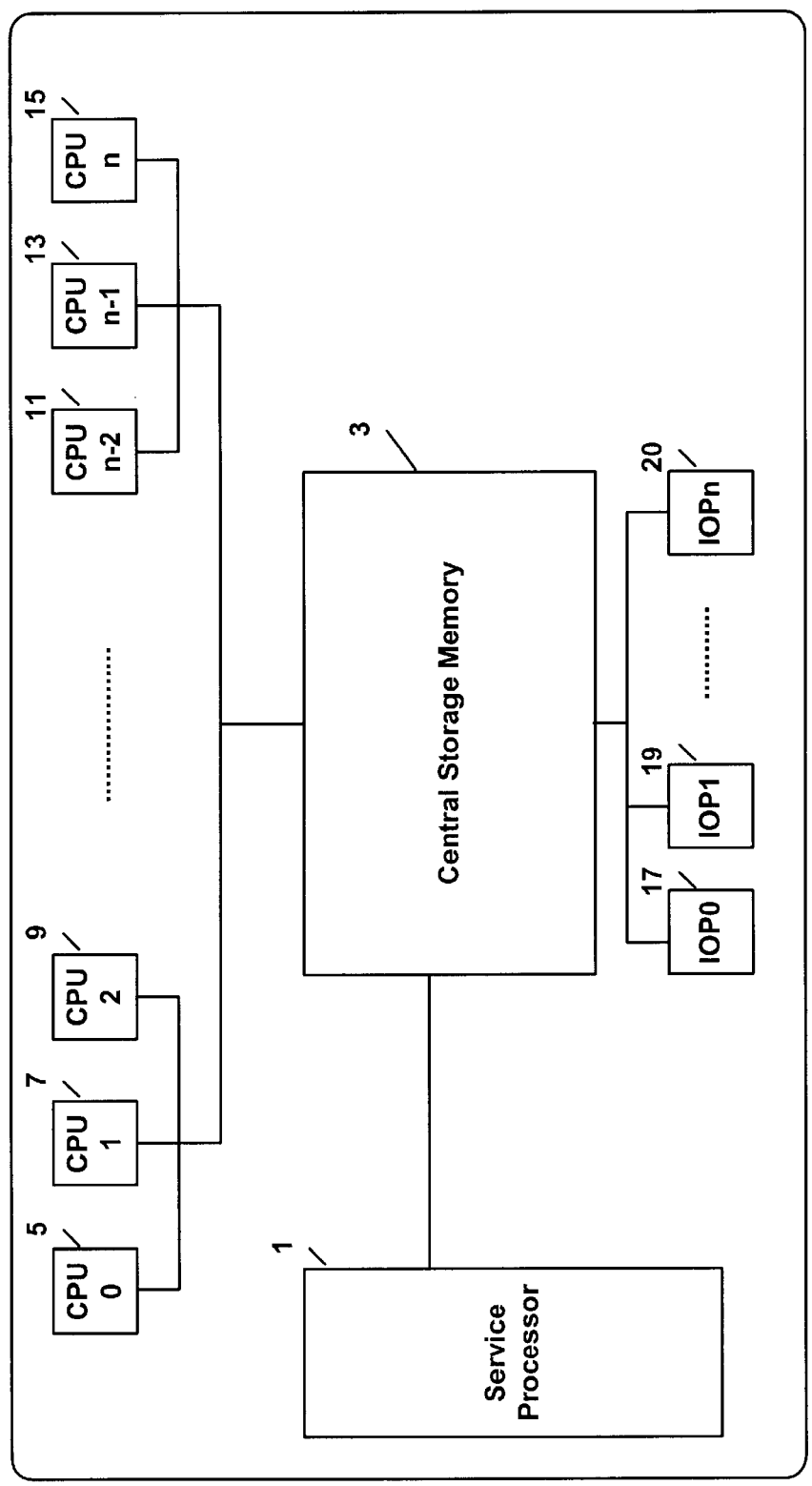
FIG. 1 shows the main elements of a computer capable of being enabled for logical partitioning.

FIG. 1 shows a conceptual overview of the main elements of an IBM system 390®("s/390") computer. Although this preferred embodiment describes the s/390, it will be understood by those of ordinary skill in the art that any computer system capable of being enabled for logical partitioning may be used. The s/390 maybe configured with one or more processors ("CPUs") 5, 7, 9, 11, 13, 15, central storage memory 3, and input/output processors 17, 19, 20 ("IOP"). Central storage memory is analogous to random access memory ("RAM") commonly found in personal computers. An IOP is a piece of hardware that allows devices such as disk drives, tape drives, and communication devices to be attached to the computer system. It is understood that a computer system used with the present invention may be configured with any number of CPUs, IOPs, and central storage memories. Read/write operations to and from central storage memory is generally much faster than similar operations to and from outboard storage memory via IOPs, and thus the capture of data to central storage memory is used for the preferred embodiment of this invention.

Figure 2:
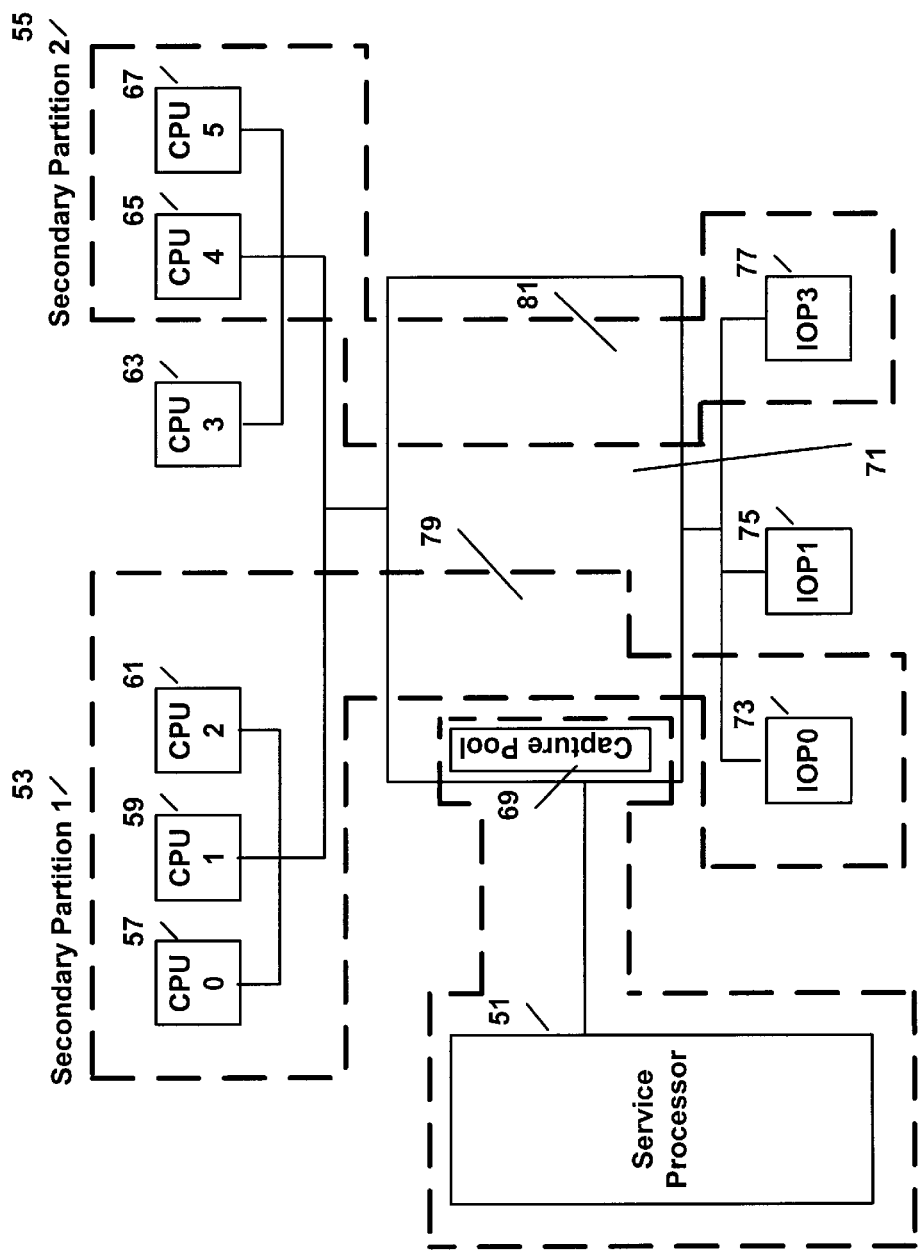
FIG. 2 shows a computer system logically partitioned into a primary partition and two secondary partitions.

FIG. 2 shows the main elements of an s/390 configured for LPAR operation. The s/390 of FIG. 2 has been defined to have three partitions including a primary partition including service processor 51 and two secondary partitions 53, 55. A first secondary partition 53 has been assigned three CPUs 57, 59, 61, one IOP 73, and a portion of central storage memory 79. A second secondary partition 55 has been assigned two CPUs 65, 67, one IOP 77 and a portion of central storage memory 81. The service processor 51 has reserved a portion of central storage memory 69 as a capture pool for storing captured data. In the preferred embodiment, the capture pool is not accessible by secondary partitions. However, in an alternative embodiment secondary partitions could access the capture pool as necessary. One CPU 63, an IOP 75, and a portion of central memory 71 have not been assigned to either of secondary partitions 53, 55 and have not been reserved by the primary partition 51 for other uses. It is understood that the number and typo of resources assigned to secondary partitions or reserved for use by the primary partition may ha varied without exceeding the scope of the present invention.

Partitions may communicate in a manner similar to that of separate physical systems. For example, if two partitions are each assigned an Ethernet or token ring adapter, the two partitions may carry on network communications as if they were separate physical systems. However, in order to take advantage of the speed potential inherent in intra-system communications, partitions may also utilize alternative communication mechanisms. For example, IBM AS/400 partitions may communicate via virtual Opticonnect/400. Virtual Opticonnect/400 is a software-only adaptation of Opticonnect/400. Opticonnect/400 is a combination of hardware and software that allows physically separate AS/400 computer systems to communicate via high speed fiber optic links. Virtual Opticonnect/400 allows partitions to communicate via high speed fiber optic links. It is understood dial the present invention allows for the utilization of any inter-partition communications mechanism known to one of ordinary skill in the art.

In addition to inter-partition communications, partitions may exchange data by reading and writing to commonly accessible storage memory. For example, where a first and second partition both have access to storage memory, both partitions may read and write data to that storage memory. This method of data exchange is highly efficient because it occurs at the speed at which the partitions read and write to the storage memory. In particular, where the storage memory is central storage memory, the exchange of data takes place at speeds faster than could be achieved through inter-partition communications or where the storage memory is outboard storage memory.

Figure 3:
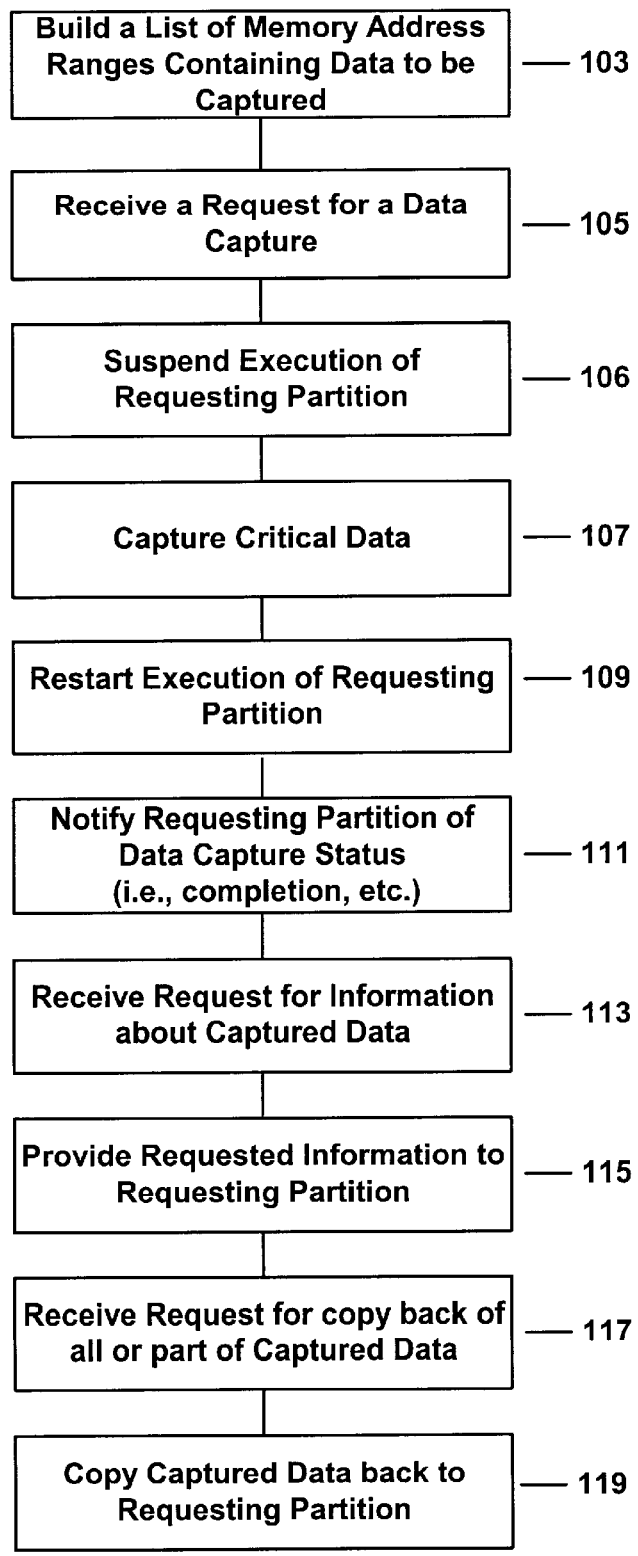
FIG. 3 is a flow chart of a method for using ancillary storage and processors to speed time critical data capture.

In one embodiment, the system provides for the suspension of a partition while the service processor captures data in accordance with a request by the partition. FIG. 3 is a flowchart of processing performed to capture data from a partition. The service processor reserves a portion of central storage memory to be used as a capture pool for storing captured data.

When a partition determines that the capture of critical data is necessary, the partition generates and issues a service call to the service processor requesting a data capture. The service call includes a list of memory address ranges containing data to be captured by the service processor as shown at step 103. The service processor receives the request for the data capture along with the accompanying memory address ranges at 105. The request for a data capture can be made using any conventional inter-partition communication mechanism. Moreover, in an alternative embodiment, the request for a data capture could be made without using an inter-partition communication method by defining an address within central storage memory and accessible by a secondary partition that the service processor would regularly poll for a "capture data" indicator. In such an embodiment, the defined memory location could also contain the memory address ranges of data to be captured.

The service processor suspends the execution of the requesting partition at 106. The service processor captures the requested data by reading said data directly from the portion of central storage memory assigned to the requesting partition and writing data directly to the service processor's capture pool, which is also located in the central storage memory, at 107. Such a data capture may be completed quickly and efficiently as it requires no inter-partition communication. Upon completion of the data capture, the service processor restarts execution of the requesting partition at 109. In an alternative embodiment, the service processor could also notify the requesting partition of the completion of the data capture as shown at 111.

In another embodiment, the service processor would not suspend or restart execution of the requesting partition as shown at steps 106 and 109. Such an embodiment would be advantageous under many circumstances including those where the requesting partition must remain engaged in critical operations.

The requesting partition may request information regarding the captured data from the service processor at 113. If such a request is made, the service processor provides such information to the requesting partition at 115. Whether to make such a request could depend upon the purpose of the data capture.

In addition, the requesting partition may request that all or a portion of the data captured be copied back to the memory address ranges from which the data was originally captured at 117. In response to such a copy-back request, the service processor would read captured data from the capture pool and write captured data to the memory address ranges from which it was originally captured at 119. In an alternative embodiment, the copy back could be automated such that no copy back request (step 117) is needed. In such an embodiment, the automated copy back could occur for every data capture or could occur selectively based upon predetermined criteria.

One aspect of an embodiment of the invention is that the capture of critical data is accelerated because the captured data is read from and written to central storage memory. As a result, data capture is more likely to be completed prior to an event that would preclude data capture.

Another aspect of an embodiment of the invention is that the time required for the capture of critical data, where execution of the requesting partition is suspended during data capture, is minimized. Thus, execution of the requesting partition is resumed earlier than would otherwise be possible. As a result, the requesting partition remains online and available for operations for periods exceeding what would be possible on a similar system not fitted with the present invention.

Another aspect of an embodiment of the invention is that delays to a requesting partition's non-data-capture operations, which are the result of the partition's participation in critical data capture operations, are minimized due to the shortened duration of the critical data capture.

The description applying the above embodiments is merely illustrative. As described above, embodiments in the form of computer-implemented processes and apparatuses for practicing those processes may be included. Also included may be embodiments in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A system for using ancillary processors to speed critical data capture, comprising:
   a computer, including:
      a first processor;
      at least one secondary processor; and
      a central storage memory comprising:
         a primary partition associated with said first processor; and
         at least one secondary partition associated with said at least one secondary processor;
            wherein a portion of said central storage memory is reserved by said primary partition as a capture pool, said capture pool not accessible by said at least one secondary partition; and
      a request for critical data capture received at said primary partition from said at least one secondary partition, said request for critical data capture including a list of memory address ranges for critical data to be captured from said at least one secondary partition;
      wherein said data capture is performed by said primary partition by:
         reading said critical data directly from said at least one secondary partition using said memory address ranges in said list; and
         writing said critical data to said capture pool.

2. The system of claim 1, further comprising an inter-partition communication means operable for enabling communication of said request for critical data capture between said at least one secondary partition and said primary partition.

3. The system of claim 1, further comprising a capture data indicator comprising an address defined within said central storage memory, said address being accessible to said at least one secondary partition; wherein said at least one secondary partition initiates said request for critical data capture via said address; and wherein further, said primary partition polls said central storage memory for said capture data indicator.

4. The system of claim 1, wherein said primary partition further performs:
   upon receipt of said request for critical data capture, suspending execution of said at least one secondary partition until said critical data capture is completed.

5. The system of claim 1, further comprising:
   a request to copy at least a portion of captured critical data to memory address ranges of said at least one secondary partition, said request to copy at least a portion of captured critical data being received at said primary partition; wherein in response to receiving said request to copy at least a portion of captured critical data to memory address ranges, said primary partition performs;
   reading said at least a portion of said captured critical data from said capture pool; and
   writing said at least a portion of said captured critical data to memory address ranges of said at least one secondary partition from which said critical data was originally captured.

6. A method for using ancillary processors and memory to speed critical data capture, comprising:
   reserving a portion of a central storage memory associated with a computer as a capture pool, said capture pool accessible to a primary partition of said central storage memory and a first processor; wherein said central storage memory comprises said primary partition and at least one secondary partition; and wherein further, said capture pool is not accessible to said at least one secondary partition;
   building a list of memory address ranges for critical data to be captured; and
   upon receiving a request for critical data capture from said at least one secondary partition, said primary partition performs:
      reading said critical data directly from said at least one secondary partition using said memory address ranges in said list; and
      writing said critical data to said capture pool.

7. The method of claim 6, wherein said primary partition further performs:
   upon receipt of said request for critical data capture, suspending execution of said at least one secondary partition until said critical data capture is completed.

8. The method of claim 6, wherein said primary partition further performs:
   in response to receiving a request to copy at least a portion of captured critical data to said memory address ranges:
      reading said critical data directly from said at least one secondary partition using said memory address ranges in said list; and
      writing said critical data to said capture pool.

9. The method of claim 6, wherein said receiving a request to capture critical data from said at least one secondary partition further includes:
   a means for communicating said request to capture critical data inter-partitionally between said at least one secondary partition and said primary partition.

10. The method of claim 6, wherein said receiving a request for critical data capture further includes:
   defining an address within said central storage memory as a capture data indicator, said address being accessible to said at least one secondary partition;
   initiating said request for critical data capture by said at least one secondary partition via said address; and
   polling said central storage memory for said capture data indicator by said primary partition.

11. A storage medium encoded with machine-readable computer program code for using ancillary processors and memory to speed critical data capture, said storage medium including instructions for causing a computer to implement a method, comprising:

reserving a portion of a central storage memory associated with a computer as a capture pool, said capture pool accessible to a primary partition of said central storage memory and a first processor; wherein said central storage memory comprises said primary partition and at least one secondary partition; and wherein further, said capture pool is not accessible to said at least one secondary partition;

building a list of memory address ranges for critical data to be captured; and upon receiving a request for critical data capture from said at least one secondary partition, said primary partition performs:

reading said critical data directly from said at least one secondary partition using said memory address ranges in said list; and writing said critical data to said capture pool.

12. The storage medium of claim 11, wherein said primary partition further performs:

upon receipt of said request for critical data capture, suspending execution of said at least one secondary partition until said critical data capture is completed.

13. The storage medium of claim 11, wherein said primary partition further performs:

in response to receiving a request to copy at least a portion of captured critical data to said memory address ranges:

reading said critical data directly from said at least one secondary partition using said memory address ranges in said list; and writing said critical data to said capture pool.

14. The storage medium of claim 11, wherein said receiving a request to capture critical data from said at least one secondary partition further includes:

a means for communicating said request to capture critical data inter-partitionally between said at least one secondary partition and said primary partition.

15. The storage medium of claim 11, wherein said receiving a request for critical data capture further includes:

defining an address within said central storage memory as a capture data indicator, said address being accessible to said at least one secondary partition;

initiating said request for critical data capture by said at least one secondary partition via said address; and polling said central storage memory for said capture data indicator by said primary partition.

* * * * *